United States Patent
Toshida et al.

[11] 3,897,858
[45] Aug. 5, 1975

[54] CLOSED LOOP TYPE DISC BRAKE

[75] Inventors: Shunichi Toshida; Takashi Ozora, both of Tokyo, Japan

[73] Assignee: Nissan Motor Company Limited, Yokohama, Japan

[22] Filed: Dec. 12, 1973

[21] Appl. No.: 424,008

Related U.S. Application Data

[62] Division of Ser. No. 295,116, Oct. 5, 1972, Pat. No. 3,844,384.

[30] Foreign Application Priority Data

Oct. 20, 1971 Japan............................. 46-83172
Oct. 20, 1971 Japan............................. 46-83173

[52] U.S. Cl............................. 188/73.4; 188/72.5
[51] Int. Cl............................................. F16d 65/14
[58] Field of Search......... 188/72.5, 73.3, 73.4, 345

[56] References Cited
UNITED STATES PATENTS

| | | | |
|---|---|---|---|
| 3,245,500 | 4/1966 | Hambling et al. | 188/73.4 |
| 3,490,565 | 1/1970 | Marschall et al. | 188/345 |
| 3,536,167 | 10/1970 | Rath | 188/73.4 |
| 3,628,636 | 12/1971 | Beller | 188/73.4 |
| 3,651,898 | 3/1972 | Habgood | 188/72.5 |
| 3,656,589 | 4/1972 | Kawake et al. | 188/72.5 |
| 3,707,210 | 12/1972 | Yokoi | 188/345 |

*Primary Examiner*—Trygve M. Blix
*Assistant Examiner*—Edward R. Kazenske

[57] ABSTRACT

A disc brake for a motor vehicle, which includes a braking disc rotatable with a vehicle wheel, a hydraulic cylinder having inner and outer pistons, directly and indirectly actuated friction pads located adjacent to both sides of the braking disc and forced against the braking disc when fluid under pressure is supplied to the disc brake from a master cylinder, a yoke which is adapted to carry the pressure of the fluid to the indirectly actuated friction pad, and a braking torque absorbing structure adapted to absorb a braking torque on the friction pads during operation whereby the yoke is freed of a duty of bearing the torque and permitted to serve only to carry the pressure of the working fluid to the indirectly actuated friction pad. The disc brake further includes a pair of guide means provided between the braking torque absorbing structure and the yoke for guiding the yoke in a direction substantially parallel to the axis of the braking disc. The disc brake also includes a ringlike insert which is interposed between the bottom wall of the outer piston and the side edge of the yoke to permit the yoke to move in a direction substantially parallel to the axis of the braking disc without rocking or vibrations.

2 Claims, 8 Drawing Figures

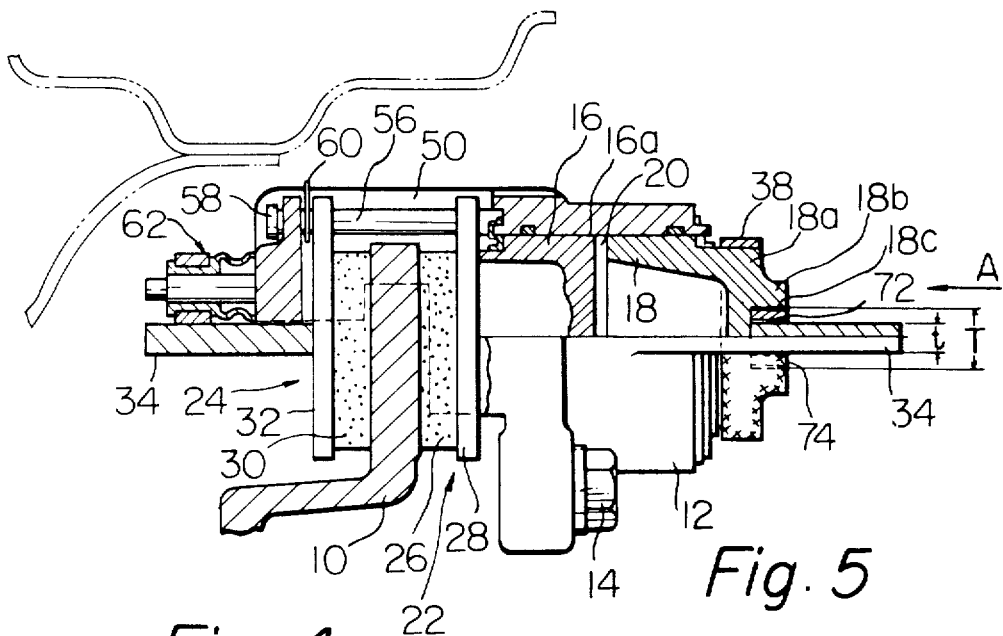
Fig. 3
Fig. 4
Fig. 5
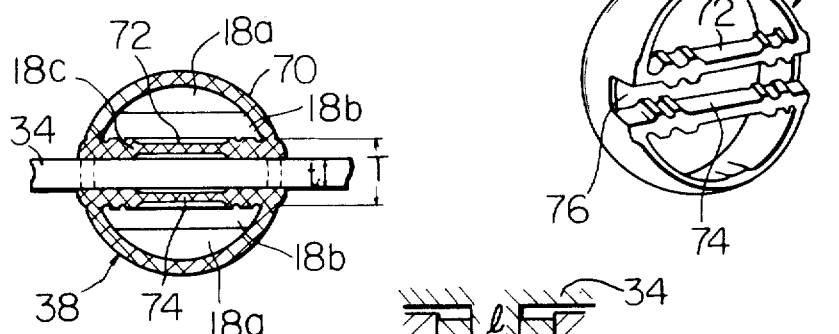
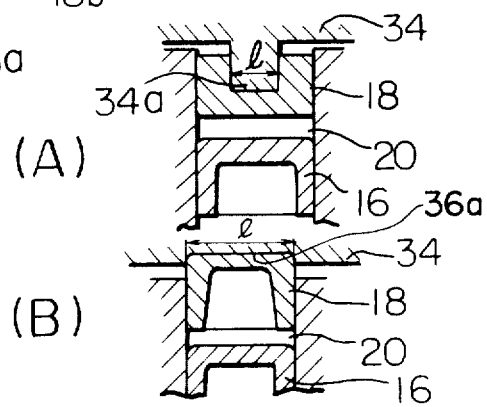
Fig. 6

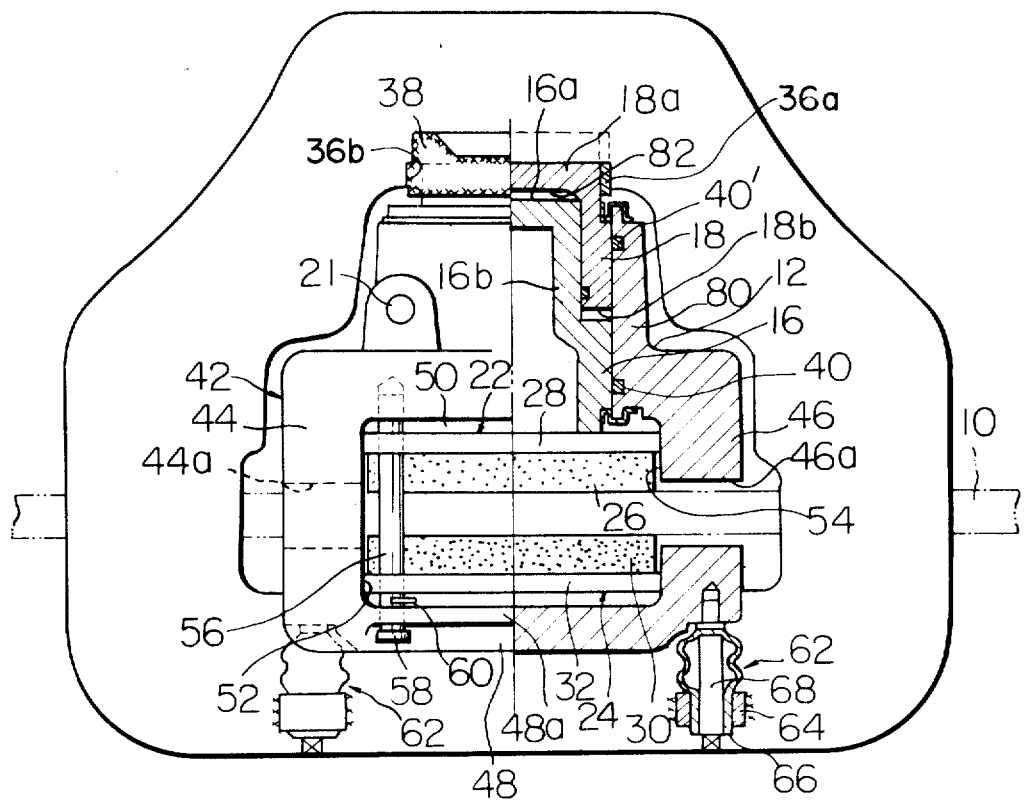
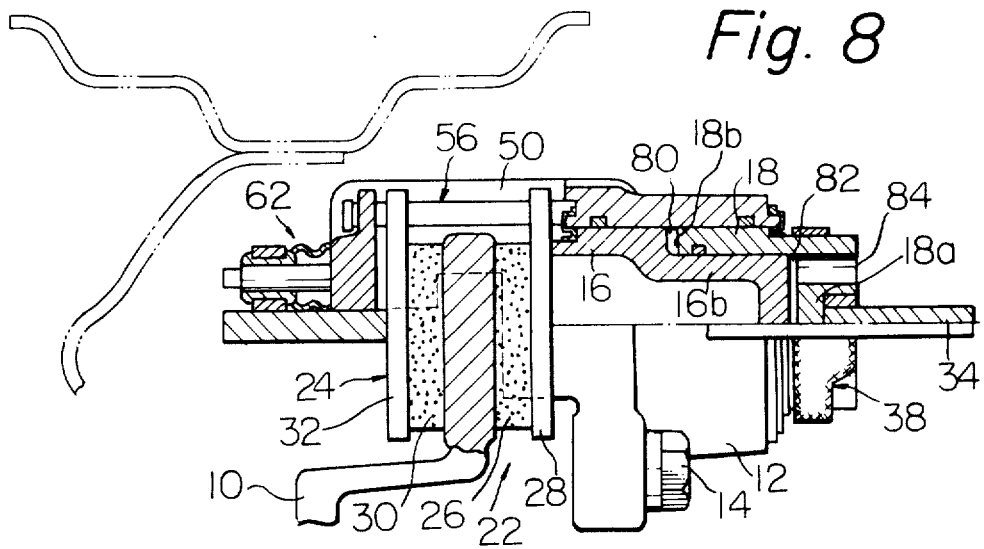

CLOSED LOOP TYPE DISC BRAKE

This is a division of application Ser. No. 295,116, filed Oct. 5, 1972, now U.S. Pat. No. 3,844,384.

This invention relates in general to friction devices and, more particularly, to a disc brake of the closed loop type for use in a motor vehicle.

In closed loop type disc brakes, it is a common practice to employ a braking disc which is rotatable with a wheel of the motor vehicle and a stationary hydraulic cylinder which is open at both ends and which is secured to a stationary part adjacent to one side of the braking disc. Two opposed pistons are axially slidably fitted in the cylinder bore of the hydraulic cylinder, defining a fluid chamber therebetween. The fluid chamber communicates with a brake pedal operated master cylinder or other source of pressurized fluid and, when the brake pedal is depressed, the fluid under pressure is supplied to the fluid chamber for urging the pistons apart. A pair of friction pad assemblies are provided, one of which is interposed between the hydraulic cylinder and the adjacent face of the braking disc and the other is positioned adjacent the opposite face of the braking disc. The two pistons are respectively associated with the two friction pad assemblies in such a manner that one piston is in abutting engagement with one friction pad assembly to directly move the assembly toward the braking disc and the other piston is mechanically connected to the other friction pad assembly through the mechanical connection toward the disc. Such mechanical connection is provided by a yoke which is connected to the indirectly actuated friction pad assembly and on which the piston associated with the indirectly actuated friction pad assembly bears when moved by the pressurized fluid supplied into the fluid chamber. The yoke is provided with a central opening which is adapted to accommodate an adjacent arcuate portion of the braking disc and to form spaced side edges which are parallel to th axis of the braking disc. Two opposed grooves are formed in the sides of an extension of the stationary hydraulic cylinder and receive the respective side edges of the opening in the yoke for slidably guiding the yoke in a direction parallel to the axis of the braking disc.

The friction pad assemblies are forced against both faces of the braking disc when the pistons are moved apart by means of the pressurized fluid and, when this occurs, a braking torque is exerted on the friction pad assemblies due to the traction applied thereto. In this instance, the braking torque on the indirectly actuated friction pad assembly is transmitted to the yoke which is consequently twisted in a plane generally perpendicular to the plane of the braking disc so that uneven wear of the friction pads would result, with one of the edges of each of the friction pads wearing at a rate greater than the other edge of the friction pad. Moreover, the braking torque transmitted to the yoke causes the friction pad assemblies to exert unequal forces on the braking disc resulting in decrease in the performance efficiency of the disc brake.

For simplicity of construction and to streamline the operation of the brake, however, it is evidently desirable that the yoke be freed of a duty of bearing the braking torque and permitted to solely serve the purpose of carrying the movement of the piston to the indirectly actuated friction pad assembly.

In order to prevent twisting of the yoke, it has heretofore been proposed to provide a torque absorbing structure which is adapted to guide the friction pad assemblies in a direction parallel to the axis of the braking disc for thereby allowing the braking torque exerted on the friction pad assemblies to transfer to the stationary part of the motor vehicle. The torque absorbing structure consists of two arm members which extend from one end of the stationary hydraulic cylinder in straddling manner over the braking disc to the other side thereof. These two arm members are not linked to each other at their free ends so that the braking torque transmitted to either one of the arm members is directly transferred to the base portions of the arm members respectively. Accordingly, the base portions of the arm members are frequently damaged due to stress concentration and, thus, stationary hydraulic cylinder should have largely sized guide structure to provide sufficient strength.

Provision, furthermore, of the side edges which are received in the opposed grooves in the extension of the stationary hydraulic cylinder is reflected by a relatively large outside diameter of the hydraulic cylinder and by restrictions which are encountered in bending or press-machining the yoke during production.

Another drawback encountered in the prior art disc brake is that it is quite difficult to cause the yoke of the disc brake to precisely move in a direction substantially parallel to the axis of the braking disc due to inherent construction of the guide mechanism provided between the yoke and the stationary hydraulic cylinder.

It is, therefore, an object of the present invention to provide a disc brake in which the yoke is freed of the duty of receiving the braking torque on either of the friction pad assemblies and accordingly permitted to solely serve the purpose of carrying the movement of one of the pistons to the indirectly actuated friction pad assembly and in which the braking torque on either of the friction pad assemblies are adapted to be patially dissipated to the stationary hydraulic cylinder. The disc brake according to the present invention thus features a simplified and compact construction and streamlined operation. As a means to achieve this perticular object, the present invention proposes to incorporate a stationary support structure which is integrally formed with the hydraulic cylinder. The support structure is provided with an opening defining opposed internal side faces which confront side edges of the directly and indirectly actuated friction pad assemblies which consequently bear at their side edges against the opposed side faces of the support structure when the friction pad assemblies are forced against the faces of the braking disc.

Another object of the present invention is to provide a disc brake which is compact in construction and highly reliable in operation.

Another object of the present invention is to provide an uncomplicated, compact and efficient disc brake in which an efficient and compact means is provided to permit the yoke of the disc brake to precisely move in a direction substantially parallel to the axis of the braking disc to be braked while simultaneously preventing other undesirable movement of the yoke with respect to the braking disc. To attain this object, the present invention features to provide a hydraulic cylinder incorporating therein a new and improved piston assembly adapted to ensure movement of the yoke of the disc brake in a direction precisely perpendicular to the plane of rotation of the braking disc whereby not only an improved braking performance efficiency of the disc brake is obtained but also even wear of the friction pads is obtained.

A further object of the present invention is to provide a disc brake in which arrangements are made so that an easy access to the friction pad assemblies is provided to facilitate inspection and replacement of the friction pad assemblies. This will prove advantageous for timely and easy maintanance and servicing of the disc brake.

These and other features and advantages of the present invention will become more apparent from the following description when taken in conjunction with the accompanying drawings which illustrate preferred embodiments of the present invention and in which:

FIG. 3 is a cross sectional view of the disc brake shown in FIG. 1;

FIG. 4 is a view in the direction of arrow A in FIG. 3;

FIG. 5 is a perspective view of the ring-like insert shown in FIGS. 1, 3 and 4;

Figure 1:
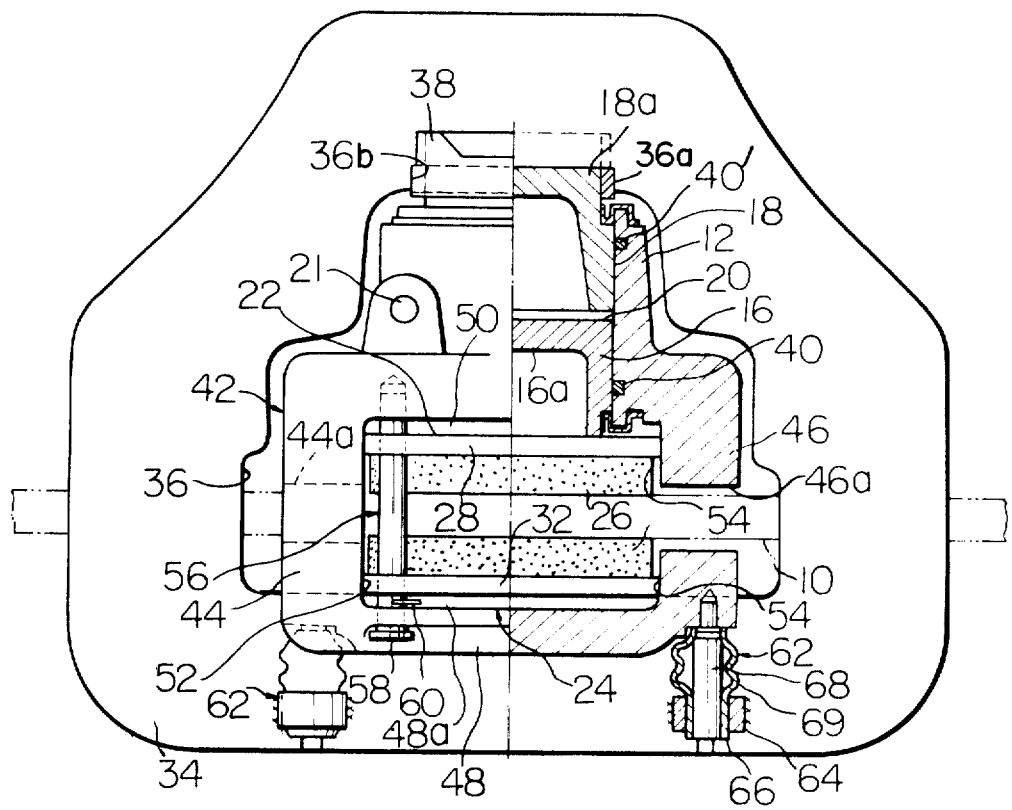
FIG. 1 is a view illustrating in section in the right half and in plan in the left half one preferred form of the disc brake according to the present invention.

FIGS. 6(A) and (B) are schematic fragmentary sectional views illustrating the relations between the piston and the yoke according to the prior method and the present invention, respectively;

FIG. 7 is a view similar to FIG. 1 but shows a modified form of the disc brake according to the present invention; and FIG. 8 is a cross sectional view of the disc brake shown in FIG. 7.

Referring now to the drawings and more particularly to FIGS. 1 to 5, there is shown a preferred embodiment of the disc brake implementing the present invention. As shown, the disc brake includes a rotatable braking disc 10 which is mounted for rotation with the wheel (not shown) of the motor vehicle. Adjacent an inner face of the braking disc 10 is positioned a hydraulic cylinder 12 which is held stationary through rigid connection with a stationary structural part (not shown) of the motor vehicle through suitable fastening means such as a bolt 14 as best seen in FIG. 3. The stationary hydraulic cylinder 12 is open at both ends and positioned to have its axis substantially parallel to the axis of the braking disc 10. Inner and outer pistons 16 and 18, respectively, are axially slidably fitted in the cylinder bore of the stationary hydraulic cylinder 12. The pistons 16 and 18 have bottom walls 16a and 18a, respectively, and define a fluid chamber 20 between the cavity of the outer piston 18 and the opposite wall 16a of the inner piston 16. The fluid chamber 20 communicates through a bore 21 with a master cylinder (not shown) so that fluid under pressure is supplied thereto when the brake pedal is depressed, whereby the pistons 16 and 18 are urged apart from each other.

Directly and indirectly actuated friction pad assemblies 22 and 24 are positioned adjacent the faces of the braking disc 10. The directly actuated friction pad assembly 22 is interposed between the braking disc 10 and the stationary hydraulic cylinder 12 and comprises a friction pad 26 and a backing plate 28 to which the friction pad is bonded or otherwise secured. The inner piston 16 is thus in abutting engagement with the inner face of the backing plate 28. The indirectly actuated friction pad assembly 24 is positioned adjacent the opposite side of the braking disc 10 and comprises a friction pad 30 and a backing plate 32 secured thereto. The backing plates 28 and 32 may preferably have larger areas than the respective friction pads 26 and 30, as illustrated.

The stationary hydraulic cylinder 12 and the friction pad assemblies 22 and 24 are housed in a yoke 34 which is generally a flat plate. The yoke 34 has a suitably shaped opening 36 which is adapted to accommodate an arcuate portion of the braking disc 10 and which has a side edge 36a which bears against the bottom wall 18a of the outer piston 18. This side edge 36a is adapted to bear against the wall portion 18a of the outer piston 18 by means of ring-like insert 38. This arrangement provides an advantageous feature that the yoke 34 is ensured to move in a direction substantially perpendicular to the plane of rotation of the braking disc 10 thereby to provide streamlined smooth operation of the disc brake as will be described hereinafter in detail. Designated by reference numerals 40 and 40' are sealing rings which are mounted between the hydraulic cylinder 12 and the two pistons 16 and 18.

When, now, the brake pedal is depressed and the fluid under pressure is supplied from the master cylinder into the fluid chamber 20 between the opposite pistons 16 and 18, then the pistons 16 and 18 are moved apart from each other by means of the fluid under pressure. The inner piston 16 thus presses upon the braking plate 28 of the directly actuated friction pad assembly 22, forcing the friction pad 26 against the braking disc 10. The outer piston 18, on the other hand, is moved away from the inner piston 16 and bears upon the side edge 36a of the yoke 34. The yoke 34 is accordingly moved in the direction of movement of the outer piston 18 with the result that the indirectly actuated friction pad assembly 24 is moved toward the braking disc 10. The braking disc 10 is in this manner powerfully gripped by the two friction pads 26 and 30, to apply brake to the wheel (not shown).

According to one feature of the present invention, a braking torque absorbing structure 42 is provided which comprises a pair of leg portions 44 and 46 which are integrally formed with the stationary hydraulic cylinder 12. The leg portions 44 and 46 extend in parallel to the axis of the braking disc 10 and straddle over the braking disc 10 and the indirectly actuated friction pad assembly 24 to the other side thereof. The leg portions 44 and 46 are respectively provided with recesses 44a and 46a to accommodate the arcuate portion of the braking disc 10. These leg portions 44 and 46 are connected to each other at their free ends by means of a linking portion 48 integrally formed therewith for the purpose to be discussed in detail. As best seen from FIGS. 1 and 2, the braking torque absorbing structure 42 is provided with an opening 50 which is partly formed by the leg portion 44 and 46 and the linking portion 48 extending therebetween and which is so sized as to receive therein directly and indirectly actuated friction pad assemblies 22 and 24. This opening 50 provides an easy access to the friction pad assemblies, facilitating inspection and replacement of the friction pad assemblies. Provision of such open space over the friction pad assemblies will also prove advantageous for the purpose of dissipating the heat evolved in the friction pads and the braking disc due to friction therebetween. The opening 50 defines two opposite side edges 52 and 54 for abutting engagement with the sides of the directly and indirectly actuated friction pad assemblies 22 and 24 so that the friction pad assemblies are guided when moved toward and away from the braking disc 10 and that the braking torques exerted on the friction pad assemblies are transferred through the leg portions to the stationary hydraulic cylinder. A pair of pad-retaining pins 56 are inserted into apertures (not identified) formed in the backing plates 28 and 32 and each of the pins 56 has one end fitted in a bore formed in the braking torque absorbing structure and the other end passed through a bore formed in a lim portion 48a of the linking portion 48. Each of the pins 56 has a head 58 and a clip 60 to prevent axial movements of the pad-retaining pin 56. With this arrangement, it should be noted that the friction pad assemblies 22 and 24 are easily disassembled from the disc brake upon removal of the pad-retaining pins 56 because the opening 50 as formed by the leg portions 44 and 46 and the linking portion 48 is so figured as to freely pass the friction pad assemblies into or out of the opening 50, and such ease of assembly is a desirable feature for repair purposes.

When the friction pad assemblies are forced against the faces of the braking disc during braking action, the friction pad asemblies are subjected to traction due to the braking torque applied thereto from the braking disc 10 and, as a result, the backing plates 28 and 32 are forced against either of the side edges 52 and 54 forming the opening 50.

The braking torque is thus received by either of the leg portions 44 and 46 and is passed therethrough to the stationary hydraulic cylinder 12, while the yoke 34 is isolated from the torque at any instant. The yoke 34 is in this manner permitted to lend itself to solely carrying the movement of the outer piston 18 to the indirectly actuated friction pad assembly 24. It should be noted in this instance that, since the braking torque absorbing structure proposed by the present invention is formed in loop shape by the leg portions and the linking portion, the braking torque received to either one of the leg portions is partly dissipated to the other one of leg portions through which the braking torque is transferred to the stationary hydraulic cylinder 12. Thus, the braking torques exerted on the friction pad assemblies are dissipated through the leg portions and the linking portion into the stationary hydraulic cylinder 12 and, therefore, the maximum braking performance efficiency will be obtained through the use of simple and compact construction.

Figure 2:
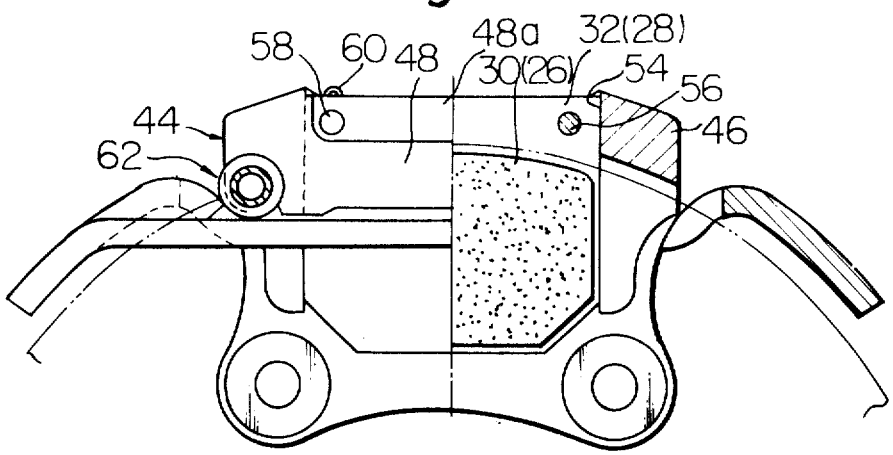
FIG. 2 is a side view, partly in section, of a portion of the disc brake shown in FIG. 1.

As best seen in FIGS. 1, 2 and 3, the disc brake according to the present invention may further includes a pair of guide means 62 to guide the yoke 34 in a direction substantially perpendicular to the plane of rotation of the braking disc 10 thereby to streamline the operation of the disc brake. Each of the guide means 62 includes a ring-like support 64 which is fixed to the yoke 34 by a suitable manner such as welding, a bushing 66 which may be made of elastic material such as rubber and which is disposed in a bore (not identified) of the ring-line support 64, and a guide pin 68 which is slidably inserted through the bushing 66 into the bore of the ring-like support 64. The guide pin 68 is directed in parallel to the direction of the movement of the friction pad assemblies and rigidly connected to the end of the leg portion of the braking torque absorbing structure 42. With this arrangement, the yoke 34 is permitted to move in the direction substantially perpendicular to the plane of rotation of the braking disc 10 whereby braking performance efficiency is increased and uneven wear of the friction pads is prevented. Indicated at 69 is dust-proofing seal means which precludes entrance of dust thereinto.

As shown in FIG. 6(A), the prior art brake disc is so arranged that the bottom walls 16a and 18a of the inner and outer pistons 16 and 18 are positioned to face each other and that the outer piston 18 bears against a tongue-like projection 34a formed on the yoke 34 at a relatively small width as indicated at l. This is inadvantageous in that the yoke 34 is liable to rock or vibrate when it is moved in a direction parallel to the axis of the braking disc whereby uneven wear of the friction pads is caused and an undesirable braking operation is brought about. To eliminate these drawbacks, the present invention proposes to provide an improved connection between the outer piston 18 and the yoke 34 as previously mentioned. As shown, the outer piston 18 is slidably disposed in the cylinder bore of the stationary hydraulic cylinder 12 in such a manner that the bottom wall of the outer piston 18 bears against the internal lengthwise edge 36a of the yoke 34 by means of insert 38. The outer piston 18 has its bottom a pair of extensions 18b defining therebetween a recess 18c having the width T, the extensions 18b being located in a ring-like insert 38 while the recess 18c receives a part of the insert 38 in a manner as will be described. As best seen in FIG. 5, the insert 38 has a ring portion 70 and a pair of radially extending bridge portions 72 and 74. The ring portion 70 of the insert 38 is disposed on the circumferential edge of the bottom 18a of the outer piston 18 and a part of the ring portion 70 is interposed between the circumferential edge of the bottom 18a of the outer piston 18 and a lateral side edge 36b adjacent the lengthwise side edge 36a (see FIG. 1), while the bridge portions 72 and 74 are located in the recess 18c formed in the outer piston 18 in a manner as shown in FIGS. 3 and 4. The radially extending bridge portions 72 and 74 form a spacing 76 into which the lengthwise side edge 36a of the yoke 34 is positioned as shown in FIGS. 3 and 4. With this arrangement, the outer piston 18 is capable of bearing against the side edge 36a of the yoke 34 at a relatively large width as shown at L in FIG. 6(B) and, therefore, the yoke 34 can be moved in the direction substantially perpendicular to the plane of rotation of the braking disc 10 without rocking or vibrations whereby streamlined smooth operation of the disc brake is obtained and uneven wear of the friction pads is prevented.

A modified form of the disc brake according to the present invention is illustrated in FIGS. 7 and 8, wherein like component parts are designated by same reference numerals. The disc brake shown in FIGS. 7 and 8 is quite similar in construction to that of FIGS. 1 to 3 except that the inner and outer pistons. In this modified form of the disc brake, a hydraulic cylinder which is represented by numeral 12 is positioned adjacent to the inner face of the backing plate 28 of the directly actuated friction pad assembly 22. Two opposing pistons 16 and 18 are slidably fitted in the cylinder bore of the hydraulic cylinder 12. As shown, the outer piston 18 is disposed in the cylinder bore in such a manner that the bottom wall thereof bears against the side edge 36a of the yoke 34 by means of ring-like insert 38. The inner piston 16 has a reduced diameter portion 16b which is slidably accommodated in the cavity (not identified) of the outer piston 18, so that a first fluid chamber 80 is defined between the reduced diameter portion 16b of the inner piston 16 and an annular side wall 18b of the outer piston 18 while a second fluid chamber 82 is defined between the bottom wall of the inner piston 16 and the cavity of the outer piston 18. The first fluid chamber 80 communicates through the bore 21 with a brake pedal operated master cylinder (not shown) to receive fluid under pressure when the brake pedal is depressed, with which the second fluid chamber 82 also communicates through a bore 84 formed in the bottom wall of the outer piston 18 to receive fluid under pressure when the brake pedal is depressed. It is to be noted that the disc brake shown in FIGS. 7 and 8 is specifically suited for use in a dual brake system. The disc brake for the dual brake system is readily obtained only by substituting the inner and outer pistons of FIGS. 1 and 3 by the pistons shown in FIGS. 7 and 8.

It will now be appreciated from the foregoing description that the first and second forms of the disc brake according to the present invention are useful especially where a simplified construction and a streamlined operation smooth of the disc brake is a matter of concern.

What is claimed is:

1. A disc brake for a motor vehicle comprising, in combination, a rotatable braking disc, a stationary hydraulic cylinder having inner and outer pistons slidable in opposite directions which are substantially parallel to an axis of said braking disc, said pistons defining a fluid chamber into which pressurized fluid is supplied when a braking action is to be initiated, directly and indirectly actuated friction pad assemblies positioned adjacent to both faces of said braking disc, said directly actuated friction pad assembly being in abutting engagement with said inner piston and thereby forced against said braking disc when the inner piston is moved by said pressurized fluid, a pair of pad-retaining pins fixed at their one ends with said hydraulic cylinder and supporting said directly and indirectly actuated friction pad assemblies, a yoke movable in a direction parallel to said axis of the braking disc and carrying the movement of said outer piston to said indirectly actuated friction pad assembly against said braking disc when said outer piston is moved by said pressurized fluid, a braking torque absorbing structure integrally formed with said hydraulic cylinder and including a pair of leg portions extending substantially in parallel to said axis of the braking disc, said pair of leg portions having said edges extending in parallel to said axis of said braking disc respectively facing side edges of said friction pad assemblies, and said friction pad assemblies bearing at their side edges against one of said side edges of said leg portions for passing a braking torque on said friction pad assemblies to said braking torque absorbing structure when the assemblies are forced against said braking disc, a pair of guide means for guiding said yoke in a direction substantially parallel to said axis of the braking disc, each of said guide means including a support secured to said yoke and having therein a bore, a bushing disposed in said bore of said support, and a guide pin rigidly connected to an end of the leg portion of said braking torque absorbing structure and slidably inserted through said bushing into said bore of said support, said guide pin being directed in parallel to the direction of movement of said friction pad assemblies.

2. A disc brake as claimed in claim 1, wherein said braking torque absorbing structure also includes a linking portion connected to said pair of leg portions at free ends thereof, and wherein said pad-retaining pins are fixed at their opposed ends to said linking portions.

* * * * *